United States Patent [19]

Fujiki et al.

[11] Patent Number: 5,276,087
[45] Date of Patent: Jan. 4, 1994

[54] CURABLE SILICONE COMPOSITION AND CURED PRODUCT THEREOF

[75] Inventors: Hironao Fujiki, Takasaki; Masayuki Ikeno, Annaka, both of Japan

[73] Assignee: Shin-Etsu Chemical Co., Ltd., Tokyo, Japan

[21] Appl. No.: 824,304

[22] Filed: Jan. 23, 1992

[30] Foreign Application Priority Data

Jan. 24, 1991 [JP] Japan .................. 3-023943

[51] Int. Cl.$^5$ ............ C08K 3/20; C08K 3/36; C08L 83/07
[52] U.S. Cl. ................. 524/786; 524/847; 524/862; 524/861; 524/860; 524/863
[58] Field of Search ........... 524/847, 786, 862, 861, 524/860, 863; 523/223, 220

[56] References Cited

U.S. PATENT DOCUMENTS

| | | | |
|---|---|---|---|
| 4,267,097 | 5/1981 | Michl et al. | 524/847 |
| 4,444,944 | 4/1984 | Matsushita | 524/862 |
| 4,720,515 | 1/1988 | Iji et al. | 525/476 |
| 4,962,151 | 10/1990 | Mellon | 524/847 |
| 5,008,307 | 4/1991 | Inomata | 524/862 |
| 5,104,919 | 4/1992 | Okami et al. | 524/862 |

FOREIGN PATENT DOCUMENTS

0096888 12/1983 European Pat. Off.
0169365 1/1986 European Pat. Off.

Primary Examiner—John C. Bleutge
Assistant Examiner—Karen A. Dean
Attorney, Agent, or Firm—Oblon, Spivak, McClelland, Maier & Neustadt

[57] ABSTRACT

A curable silicone composition which can cure using hydrosilylation, comprising an aluminum oxide powder and/or silica powder, the powders each consisting of substantially spherical particles with an average particle diameter of 50 μm or below and an elongation of from 1.0 to 1.4 and being such that the respective amounts of alkali metal ions and halogen ions are extracted with 50 ml of water from 5 g of the powder at 121° C. for 20 hours are not more than 10 ppm, wherein the amount of the component (D) is from 25 to 90% by weight based on the composition, and the ratio of the amount of hydrosilyl groups contained in the components (A) and (B) to the amount of alkenyl groups contained in the components (A) and (B) is in the range from 0.5/1 to 1.5/1. When the composition is used as a protective material or encapsulating material for devices such as ICs, generated heat can be dissipated efficiently and the devices are not be broken by abrasion. There are no fears of causing corrosion of the devices.

5 Claims, No Drawings

CURABLE SILICONE COMPOSITION AND CURED PRODUCT THEREOF

BACKGROUND OF THE INVENTION

1. Field of the Invention

This invention relates to a curable silicone composition, and a cured product thereof, for use as a protective material, encapsulating material or the like for electrical and electronic parts, such as ICs.

2. Description of the Prior Art

Curable silicone compositions and cured products thereof are in use as, for example, a protective material or encapsulating material for electrical and electronic parts such as ICs. Silicones, however, generally have a low coefficient of thermal conductivity and, especially when used as an encapsulating material for high-capacity devices, cannot dissipate effectively heat generated from the devices. Therefore, the silicone encapsulating materials cannot prevent the influence of heat on solder or devices, and are unsatisfactory in reliability.

In order to improve the thermal conductivity of silicone encapsulating materials, a filler of good thermal conductivity has been incorporated in the encapsulating materials. The filler of high thermal conductivity for such use include, for example, silica powder, alumina powder, silicon carbide powder, silicon nitride powder, magnesium oxide powder, diamond powder, powders of metal such as iron, stainless steel, copper, etc., carbon powder and so on.

Of these fillers, the metal powders, carbon powder and the like are electrically conductive and, hence, cannot be used for IC-encapsulating silicone compositions or the like intended to provide electrical insulation. On the other hand, crystalline powders such as silica powder, alumina powder, silicon carbide powder, silicon nitride powder, magnesium oxide powder, diamond powder, etc. are electrically insulating and have good thermal conductivity. On that point, the crystalline powders are suitable for use as a filler in the silicone compositions. Where the crystalline powder used as a filler contains ionic impurities, however, the ionic impurities may dissolve in water vapor penetrating through the silicone, and the resulting solution may exude to the surface of the device or the like. Consequently, corrosion of the device or the like is accelerated in the long run. On this account, crystalline powders with ionic impurity contents rendered as low as possible have been compounded as a filler in silicone gels, silicone potting materials, etc. used heretofore as an encapsulating material for electrical and electronic parts.

However, silicones used in the conventional encapsulating materials have a high coefficient of thermal expansion and the above crystalline powders have a high hardness. Where a silicone comprising such a highly hard filler is used as an encapsulating material, therefore, the device or wiring encapsulated in the silicone might be broken by abrasion.

Namely, heat generated from devices or the like in electrical or electronic parts in use causes thermal expansion of the silicone encapsulating material. The thermal expansion, and shrinkage upon cooling, will be accompanied by movement of the crystalline powder contained in the silicone encapsulating material. During the movement, edge portions of the crystalline particles may abrade the device or wiring, possibly resulting in failure of the device or breakage of the wiring.

SUMMARY OF THE INVENTION

It is an object of the present invention to provide a curable silicone composition and a cured product thereof which have good electrical insulation properties and thermal conductivity and which will not cause abrasion or corrosion of devices, wiring, etc. encapsulated therein.

To attain the above object, the present invention provides a curable silicone composition comprising:

(A) an alkenyl-containing organopolysiloxane which contains an average of 0.5 or more alkenyl groups in its molecule, (B) an organohydrogenpolysiloxane containing at least two silicon-bonded hydrogen atoms in its molecule, (C) a platinum group metal catalyst, and (D) at least one member selected from the group consisting of aluminum oxide powder and silica powder, the powders each consisting of substantially spherical particles with an average particle diameter of 50 μm or below and an elongation (length-to-breadth ratio) of from 1.0 to 1.4 and being such that the respective amounts of alkali metal ions and halogen ions which are extracted with 50 ml of water from 5 g of the powder at 121° C. for 20 hours are not more than 10 ppm, wherein the amount of the component (D) is from 25 to 90% by weight based on the composition, and the ratio of the amount of hydrosilyl groups contained in the components (A) and (B) to the amount of alkenyl groups contained in the components (A) and (B) is in the range from 0.5/1 to 1.5/1.

The present invention also provides a cured product obtained by curing the curable silicone composition as defined above.

The curable silicone composition according to the present invention comprises a silicone material which has a low coefficient of thermal expansion, and a powder which has a high thermal conductivity with a non-edgy, substantially spherical particle shape. When the composition is used as a protective material or encapsulating material for devices or wiring in electrical and electronic parts such as ICs, therefore, the heat generated from the devices or the like can be dissipated efficiently and the devices or wiring cannot be broken by abrasion. Because ionic impurity contents of the above powder are very low, furthermore, there is no possibility that ionic impurities may come out of the cured product of the composition, through dissolution, to cause corrosion of the devices or wiring.

DETAILED DESCRIPTION OF PREFERRED EMBODIMENTS

(A) Alkenyl-Containing Organopolysiloxane

The alkenyl-containing organopolysiloxane of component (A) is a silicone having the general composition formula (1):

$$R_aSiO_{(4-a)/2} \quad (1)$$

wherein R is a hydrogen atom or an unsubstituted or substituted monovalent hydrocarbon group of from 1 to 20 carbon atoms, preferably from 1 to 12 carbon atoms, for example, an alkyl group such as preferably methyl, ethyl, propyl, butyl, cyclohexyl, etc.; an alkenyl group such as preferably vinyl, allyl, propenyl, butenyl, etc.; an aryl group such as preferably phenyl, tolyl, xylyl, etc.; an aralkyl group such as preferably benzyl, phenylethyl, etc.; a halogen-substituted hydrocarbon group such as preferably chloromethyl, 3,3,3-trifluoropropyl, and groups having the preferred formulas: $C_4F_9CH_2CH_2-$, $C_8F_{17}CH_2C_2-$, etc.; a halogen-substituted polyether group such as groups of the formula: $C_3F_7O[CF_2(CF_3)CF-O-]_mCH_2CH_2-$ (wherein m is an integer of from 0 to 5), and so on, and a is a number in the range from 1.9 to 2.4. The alkenyl-containing organopolysiloxane of component (A) may be a mixture of two or more silicones having the general composition formula (1).

The alkenyl-containing organopolysiloxane of the general composition formula (1) may take the form of a straight-chain molecule consisting only of $R_3SiO_{\frac{1}{2}}$ units and $R_2SiO$ units or a branched molecule containing $RSiO_{3/2}$ units and/or $SiO_{4/2}$ units as well as the $R_3SiO_{\frac{1}{2}}$ and $R_2SiO$ units.

The component (A) should contain an average of 0.5 or more alkenyl groups, such as vinyl groups, in its molecule. Such alkenyl groups serve as crosslinking sites at the time of cure of the composition according to the present invention. Basically, therefore, the composition of the present invention cannot cure unless there is an organopolysiloxane molecule which contains two or more alkenyl groups. Accordingly, the number of alkenyl groups referred to herein is the average number of alkenyl groups for the case where the component (A) is a mixture of molecules each of which contain 0, 1, 2 or more alkenyl groups. Where the component (A) consists of a single compound, the compound should contain two or more alkenyl groups in its molecule.

The group R may fundamentally be any of the aforementioned groups, among which a preferred alkenyl group is the vinyl and a preferred group in the other classes is the methyl. Where resistance to solvents is needed, a group comprising a fluorine-containing group is preferred. Where flexibility at low temperatures is required, it is effective to introduce about 1 to 10 mol % of phenylmethylsiloxy units or diphenylsiloxy units, as is known conventionally, and it is also effective to introduce from 5 to 80 mol % of trifluoropropyl units or methyl units. Furthermore, it is also effective to introduce about 1 to 5 mol % of $RSiO_{3/2}$ units into the backbone chain of the component (A). Because an increase in molecular weight may lead to gelation, however, introduction of about 2 to 3 mol % of the $RSiO_{3/2}$ units into the backbone chain is most effective in offering low-temperature flexibility, from the viewpoint of balance with other properties. With the most effective introduction, cure rate of the composition is also improved remarkably.

The alkenyl-containing organopolysiloxane as above can be prepared by conventionally known processes. For instance, the alkenyl-containing organopolysiloxane can be obtained by bringing an organocyclopolysiloxane and a compound having $R_3SiO_{\frac{1}{2}}$ unit, which will form a terminal end group of the desired organopolysiloxane, into an equilibration reaction in the presence of an alkali or acid catalyst.

More specifically, an organopolysiloxane blocked by dimethylvinylsiloxyl at one end thereof can be obtained, for example, by ring-opening polymerization of a cyclic siloxane trimer such as 1,3,5-tris(3,3,3-trifluoropropyl)-trimethylcyclotrisiloxane, hexamethylcyclotrisiloxane, etc., using trimethylsiloxylithium as an initiator, either with heating or at a comparatively low temperature in the presence of a polar solvent such as tetrahydrofuran, dimethylsulfoxide, dimethylformamide, etc., followed by neutralizing with dimethylvinylchlorosilane.

The blocked organopolysiloxane can also be obtained by another process, in which ring-opening polymerization of a cyclic siloxane trimer such as 3,3,5-tris(3,3,3-trifluoropropyl)trimethylcyclotrisiloxane is carried out in the presence of a five-coordinate silicon compound, such as those disclosed in Japanese Patent Publication (KOKOKU) No. 45-1070 (1970), for example,

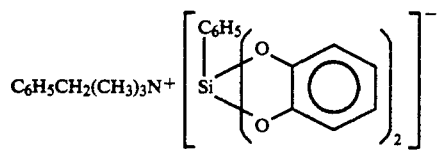

in a polar solvent such as acetonitrile at a temperature ranging from 0° to 50° C., with trimethylhydroxysilane as an initiator, and the polymerization reaction product is neutralized with dimethylvinylchlorosilane. In other similar process which is also applicable, the ring-opening polymerization is carried out using dimethylvinylhydroxysilane as an initiator, followed by neutralization with acetic acid.

The process for preparation of the component (A) is not limited to those processes in which only an organopolysiloxane blocked by an alkenyl-containing siloxyl group at one end is synthesized, as in the above processes. That is to say, processes for preparing the component (A) as a mixture of a plurality of alkenyl-containing organopolysiloxanes are also applicable. Such processes include, for example, a process in which a compound having $CH_2=CHSi(R_2)O_{\frac{1}{2}}$ unit and/or $R_3SiO_{\frac{1}{2}}$ unit, which will form a terminal group of the desired product, and cyclic siloxanes such as octamethylcyclotetrasiloxane are equilibrated in the presence of an alkali catalyst or an acid catalyst. Where this process is used, it is necessary to estimate beforehand the structures of all alkenyl-containing organopolysiloxanes that may be produced. The alkenyl-containing organopolysiloxanes produced by the process include, for example, the compounds having the following formulas:

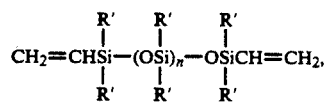

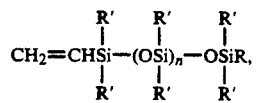

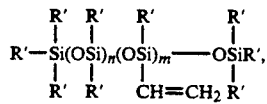

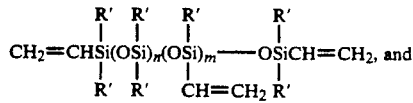

-continued

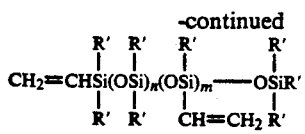

wherein in the formulas R' is the substituent group R contained in the above siloxane unit which will form a terminal group of the desired product or a substituent group possessed by the above cyclic siloxane, other than alkenyl. More specific and preferred examples of R' include hydrogen, alkyl groups such as preferably methyl, ethyl, propyl, butyl, cyclohexyl, etc.; aryl groups such as preferably phenyl, tolyl, xylyl, etc.; halogen-substituted hydrocarbon groups such as preferably 3,3,3-trifluoropropyl and groups having the formulas: $C_4F_9CH_2CH_2-$, $C_8F_{17}CH_2CH_2-$, etc.; halogen-substituted polyether groups such as groups having the formula: $C_3F_7O[CF_2(CF_3)CF]_1CH_2CH_2-$ (wherein 1 is an integer of from 0 to 5), and so on. In the above formulas, m and n are each a positive integer.

(B) Organohydrogenpolysiloxane

The organohydrogenpolysiloxane of component (B) is a silicone consisting of straight-chain, branched, cyclic or network-structured molecules, each of the molecules containing at least two silicon atoms to which a hydrogen atom is directly bonded. The component (B) reacts with the above component (A), and functions as a crosslinking agent.

In the component (B), examples of the substituent groups other than the silicon-bonded hydrogen atoms include those exemplified for the R in the general composition formula (1) above. The component (B) is generally used in an amount of from 0.5 to 1.5 equivalents, preferably from 0.8 to 1.2 equivalents, per alkenyl group in the component (A). If the amount is less than 0.5 equivalent, crosslink density becomes excessively low, causing adverse effects on the heat resistance of the resulting cured silicone gel. Amounts in excess of 1.5 equivalents, on the other hand, will cause a foaming problem due to dehydrogenation reaction or a bad effect on heat resistance.

Such organohydrogenpolysiloxanes can be prepared easily by conventionally known processes. Generally, the organohydrogenpolysiloxane is prepared, for example, by equilibrating tetrahydrotetramethylcyclotetrasiloxane and/or octamethylcyclotetrasiloxane with a compound having $(CH_3)_3SiO_{\frac{1}{2}}$ unit and/or $H(CH_3)_2SiO_{\frac{1}{2}}$ unit, which will become a terminal group of the desired product, in the presence of a catalyst such as sulfuric acid, trifluoromethanesulfonic acid, methanesulfonic acid, or the like at a temperature of from about $-10°$ to about $40°$ C.

(C) Platinum Group Metal Catalyst

The platinum group metal catalyst of component (C) is used for accelerating the addition reaction (hydrosilation) between the components (A) and (B), and is one of those known catalysts suitable for this type of addition reaction. Examples of the component (C) include elementary metals of the platinum group, such as platinum, rhodium, ruthenium, palladium, etc., and compounds of these metals. Among these, particularly preferred are platinum catalysts, for example, platinum black, chloroplatinic acid, alcohol-modified chloroplatinic acid, complexes of chloroplatinic acid with olefin, aldehyde, vinylsiloxane or acetylene alcohol, and so on.

The amount of the component (C) to be used may be suitably selected according to the desired cure rate. In general, the amount of the component (C), calculated as platinum, may be in the range from 0.1 to 500 ppm, preferably from 1 to 200 ppm, based on the component (A).

(D) Aluminum Oxide Powder and/or Silica Powder

The aluminum oxide powder and/or silica powder of component (D) is aluminum oxide powder, silica powder or a mixture of these powders, and is a filler for enhancing the thermal conductivity of the silicone composition of the present invention.

The component (D) should have a non-edgy, substantially spherical particle shape, in order to reduce the physical damage to the devices or the like arising from thermal expansion of the alkenyl-containing organopolysiloxane (A) and organohydrogenpolysiloxane (B) as described above. Further, the component (D) should have low ionic impurity contents, so as to prevent the corrosion of the devices or the like. To meet these requirements, the powder of component (D) consists of substantially spherical particles with an average particle diameter of 50 μm or below and an elongation (length-to-breadth ratio) of from 1.0 to 1.4 and being such that the respective amounts of alkali metal ions and halogen ions which are extracted with 50 ml of water from 5 g of the powder at 121° C. for 20 hours are not more than 10 ppm, preferably not more than 2 ppm.

The component (D) as above can be obtained, for example, by melting a metallic silicon powder or a metallic aluminum powder and oxidizing the molten material. Preferable examples of the component (D) include high-purity synthetic spherical silicas SO-25R and SO-25H (products by Admatechs Co., Ltd.), high-purity alumina, etc.

The amount of the component (D) used in the composition of the present invention is generally from 25 to 90% by weight, preferably from 60 to 80% by weight, based on the composition. If the amount of the component (D) is less than 25% by weight, the dissipation of heat and the reduction of thermal expansion will be so slight that the object of the present invention cannot be attained satisfactorily. If the amount is more than 90% by weight, on the other hand, the composition will be poor in fluidity, leading to workability problems in casting the composition into electrical or electronic parts or in other operations.

Other Ingredients

In addition to the components (A), (B), (C) and (D) described above, a variety of additives may be compounded in the curable silicone composition of the present invention, in order to control the cure rate, shelf stability, etc. of the composition. The additives which can be compounded include, for example, vinyl-containing organosiloxanes such as methylvinylcyclotetrasiloxane; triallyl isocyanurate, alkyl maleate, acetylene alcohol, and silane-modified or siloxane-modified products thereof; hydroperoxides, tetramethylethylenediamine, and mixtures thereof; and so on. The amount of these additives compounded is preferably from 100 to 100000 ppm based on the composition.

Preparation of Curable Silicone Composition

The curable silicone composition according to the present invention can be prepared by compounding the above components (A), (B), (C) and (D) in predetermined amounts.

For example, the curable silicone composition can be obtained by simply mixing the components (A), (B), (C) and (D). In this case, the order in which the components are added is not particularly limited. Besides, it is preferable to introduce a heat treatment step into the process of preparing the mixture. Such heat treatment is carried out desirably after mixing the components (A), (B) and (D) or after mixing the components (A) and (D). The heat treatment temperature may be generally from 100° to 180° C. When such heat treatment step is introduced, it is possible to obtain the desired composition with better stability of coefficient of thermal conductivity, viscosity and other properties.

Preparation of Cured Product

The cured product according to the present invention can be obtained by casting the above curable silicone composition, for example, into a mold, and curing the composition by known techniques such as room temperature curing, heat curing, etc. A preferable cure is a heat curing carried out, for example, at 150° C. for 30 to 60 minutes.

The cured product according to the present invention has high purity, high thermal conductivity and low coefficient of thermal expansion. Therefore, the cured product of the present invention is suited to application as a potting material for electrical and electronic parts, etc., and to other similar applications.

EXAMPLES

The present invention will now be described in more detail with reference to the following nonlimitative examples, in which "part(s)" means "part(s) by weight" and Me and Vi in siloxane units shown in Example 2 stand for a methyl group and a vinyl group, respectively.

EXAMPLE 1

Twenty-seven (27) parts of a polydimethylsiloxane blocked by dimethylvinylsiloxyl at both ends thereof having a viscosity of 800 cP at 25° C., 40 parts of a dimethylpolysiloxane blocked by trimethylsiloxyl at both ends thereof having a viscosity of 800 cP at 25° C., 33 parts of a dimethylpolysiloxane blocked by dimethylvinylsiloxyl at one end thereof, and by trimethylsiloxyl at the other end thereof, having a viscosity of 800 cP at 25° C., and 350 parts of aluminum oxide powder No. 1 shown in Table 1 below were kneaded at 150° C. for 1 hour. After cooling, the kneaded mixture was admixed uniformly with 0.015 part of ethynylcyclohexanol, and then with 0.05 parts of a chloroplatinic acid-vinylsiloxane complex (platinum content: 1% by weight). The resulting mixture was further admixed uniformly with 0.87 part of a methylhydrogenpolysiloxane blocked by dimethylhydrogensiloxyl groups at both ends thereof containing 0.54% of silicon-bonded hydrogen atoms and having a viscosity of 8 cP (25° C.), to prepare a curable silicone composition. When the composition was cured by heating at 150° C. for 30 minutes, a gel-like cured product having a penetration of 64 (ASTM D 1403) was obtained.

EXAMPLE 2

Seventy-one (71) parts of a vinyl-containing organopolysiloxane consisting of 94.24 mol % of $Me_2SiO$ units, 0.52 mol % of $ViMe_2SiO_{\frac{1}{2}}$ units, 2.24 mol % of $Me_3SiO_{\frac{1}{2}}$ units and 3 mol % of $MeSiO_{3/2}$ units and having a viscosity of 1500 cP (25° C.), 29 parts of an organopolysiloxane consisting of 94 mol % of $Me_2SiO$ units, 3 mol % of $Me_3SiO_{\frac{1}{2}}$ units and 3 mol % of $MeSiO_{3/2}$ units and having a viscosity of 500 cP (25° C.), and 350 parts of aluminum oxide powder No. 2 shown in Table 1 were kneaded at 150° C. for 1 hour. After cooling, the kneaded mixture was admixed uniformly with 0.03 part of ethynylcyclohexanol, and then with 0.06 part of a chloroplatinic acid-vinylsiloxane complex (platinum content: 1% by weight). Further, the mixture thus obtained was admixed uniformly with 4.3 parts of a methylhydrogenpolysiloxane consisting of 10 mol % of $Me_2HSiO_{\frac{1}{2}}$ units and 90 mol % of $Me_2SiO$ units and having a viscosity of 18 cP (25° C.) and 6.7 parts of a methylhydrogenpolysiloxane consisting of 2.5 mol % of $Me_2HSiO_{\frac{1}{2}}$ units, 2.5 mol % of $Me_3SiO_{\frac{1}{2}}$ units and 95 mol % of $Me_2SiO$ units and having a viscosity of 35 cP (25° C.), to prepare a curable silicone composition. When cured by heating at 150° C. for 30 minutes, the composition became a gel-like cured product having a penetration of 60 (ASTM D 1403).

COMPARATIVE EXAMPLE 1

A composition was prepared in the same manner as in Example 1 except that aluminum oxide powder No. 3 shown in Table 1 was used, in place of the No. 1 used in Example 1. The composition thus obtained became a gel-like cured product with a penetration of 60 (ASTM D 1403) when cured by heating at 150° C. for 30 minutes.

COMPARATIVE EXAMPLE 2

A composition was prepared in the same manner as in Example 1 except that aluminum oxide powder No. 4 shown in Table 1 was used, in place of the No. 1 used in Example 1. When cured by heating at 150° C. for 30 minutes, the composition gave a gel-like cured product having a penetration of 55 (ASTM D 1403).

TABLE 1

| Aluminum oxide powders used | | | | |
| --- | --- | --- | --- | --- |
| | Average particle diameter (μm) | Elongation | $Cl^-$ content (ppm) | $Na^+$ content (ppm) |
| No. 1 | 10 | 1.1 | 1 | 1 |
| No. 2 | 15 | 1.1 | 3 | 1 |
| No. 3 | 50 | 1.6 | 30 | 200 |
| No. 4 | 12 | 1.5 | 14 | 20 |

Remarks: The $Cl^-$ content and $Na^+$ content were measured by mixing 5 g of a powder with 50 ml of pure water in a beaker, placing the beaker in an closed oven the inside of which was controlled to 121° C. for 20 hours, filtering the liquid in the beaker to obtain a filtrate, which was analyzed for the concentrations of $Cl^-$ and $Na^+$.

The cured products obtained in Examples and Comparative Examples above were subjected to measurement of coefficient of thermal conductivity. The results are set forth in Table 2 below.

In addition, corrosion properties of bare copper wires after they were coated respectively with the above cured products were examined as follows.

Bare copper wires of 0.1 mm in diameter were wound around a Teflon plate. The compositions obtained in Examples 1 and 2 and Comparative Examples 1 and 2 above were cast and cured on the copper wires, respectively. The specimens thus obtained were placed into a test vessel controlled to a temperature of 120° C. and a relative humidity of 85%. Then a DC voltage of 100 V was applied to each of the specimens in the test vessel for 500 hours, and the specimens were checked for traces of corrosion. The results are shown in Table 2, in which A indicates that there were no traces of corrosion and B indicates that there was a trace of corrosion.

TABLE 2

| Properties of the cured products obtained | | |
|---|---|---|
| | Coefficient of thermal conductivity (cal/cm · sec · °C.) | Corrosion resistance (PCT) |
| Example 1 | $30 \times 10^{-4}$ | A |
| Example 2 | $30 \times 10^{-4}$ | A |
| Comparative Example 1 | $20 \times 10^{-4}$ | B |
| Comparative Example 2 | $25 \times 10^{-4}$ | B |

We claim:

1. A curable silicone composition comprising:
   (A) an alkenyl-containing organopolysiloxane which contains an average of 0.5 or more alkenyl groups in its molecule,
   (B) an organohydrogenpolysiloxane containing at least two silicon-bonded hydrogen atoms in its molecule,
   (C) a platinum group metal catalyst, and
   (D) a corrosion resistant effective amount of aluminum oxide powder consisting of substantially spherical particles with an average particle diameter of 50 μm or below and an elongation of from 1.0 to 1.4 and being such that the respective amounts of alkali metal ions and halogen ions which are extracted with 50 ml of water from 5 g of the powder at 121° C. for 20 hours is not more than 10 ppm, wherein the amount of the component (D) is from 25 to 90% by weight based on the composition, and the ratio of the amount of hydrosilyl groups contained in the components (A) and (B) to the amount of alkenyl groups contained in the components (A) and (B) is in the range from 0.5/1 to 1.5/1.

2. The composition according to claim 1, wherein the alkenyl-containing organopolysiloxane (A) is represented by the general composition formula (1):

$$R_a SiO_{(4-a)/2} \qquad (1)$$

wherein R is a hydrogen atom or an unsubstituted or substituted monovalent hydrocarbon group of from 1 to 20 carbon atoms and a is a number in the range from 1.9 to 2.4.

3. The composition according to claim 2, wherein R consists of the vinyl group and the methyl group.

4. The composition according to claim 1, wherein the organohydrogenpolysiloxane (B) is contained such that the silicon-bonded hydrogen atoms therein are present in an amount of from 0.5 to 1.5 equivalents per equivalent of the alkenyl groups contained in the component (A), and the component (C) is contained in an amount of 0.1 to 500 ppm based on the component (A).

5. A cured product obtained by curing the curable silicone composition as defined in claim 1.

* * * * *